(12) United States Patent
Itoh et al.

(10) Patent No.: US 7,049,356 B2
(45) Date of Patent: May 23, 2006

(54) LOW FOGGING THERMOPLASTIC ELASTOMER COMPOSITION AND MANUFACTURING METHOD AND USE OF SAME COMPOSITION

(75) Inventors: Yuichi Itoh, Chiba (JP); Kunihiko Mizumoto, Chiba (JP); Hiroyasu Yamaoka, Chiba (JP); Akira Uchiyama, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/779,558

(22) Filed: Feb. 9, 2001

(65) Prior Publication Data

US 2001/0016620 A1    Aug. 23, 2001

(30) Foreign Application Priority Data

Feb. 9, 2000  (JP) .............................. 2000-032184
May 1, 2000   (JP) .............................. 2000-132352

(51) Int. Cl.
*C08L 91/00* (2006.01)
*C08L 9/00*  (2006.01)
*C08J 3/24*  (2006.01)

(52) U.S. Cl. ........................ 524/77; 524/525; 524/528; 524/848

(58) Field of Classification Search ................ 524/525, 524/528, 80, 77, 848
See application file for complete search history.

(56) References Cited

U.S. PATENT DOCUMENTS

| | | | | |
|---|---|---|---|---|
| 4,220,579 A | * | 9/1980 | Rinehart ..................... | 524/525 |
| 4,239,862 A | * | 12/1980 | Matthews et al. .......... | 524/385 |
| 4,311,628 A | * | 1/1982 | Abdou-Sabet et al. ...... | 524/447 |
| 4,728,692 A | * | 3/1988 | Sezaki et al. ............... | 524/504 |
| 4,818,785 A | * | 4/1989 | Otawa et al. ............... | 524/536 |
| 5,597,867 A | | 1/1997 | Tsujimoto et al. | |
| 5,902,674 A | | 5/1999 | Makino et al. | |

FOREIGN PATENT DOCUMENTS

| | | |
|---|---|---|
| DE | 196 39 865 A1 | 4/1997 |
| EP | 0 275 702 A2 | 7/1988 |
| EP | 0 286 409 A2 | 10/1988 |
| EP | 0 371 743 A2 | 6/1990 |
| EP | 0 770 645 A2 | 5/1997 |
| EP | 1 033 226 A2 | 9/2000 |
| JP | 2000302919 A2 | 10/2000 |
| JP | A2000302919 | 10/2000 |

* cited by examiner

*Primary Examiner*—Kelechi C. Egwim
(74) *Attorney, Agent, or Firm*—Birch, Stewart, Kolasch & Birch, LLP

(57) ABSTRACT

This invention relates to a perfectly or partially crosslinked olefinic thermoplastic elastomer composition which comprises 10 to 90 parts by weight of a crystalline polyolefin (a), 90 to 10 parts by weight of an olefin-based copolymer rubber (b) (the total amount of the components (a) and (b) being 100 parts by weight) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt; an olefinic thermoplastic elastomer composition which is obtainable by subjecting a mixture including 40 to 85 parts by weight of an ethylene-based copolymer rubber (A), 60 to 15 parts by weight of an olefinic resin (B) and 45 parts by weight or less of a softening agent (C) [the total amount of the components (A), (B) and (C) being 100 parts by weight] to dynamic heat treatment in the presence of a crossliking agent and which has a gloss value of 80% or more and a haze value of 10% or less on glass plate when subjected to the fogging test at a condition of 100° C. and 3 hours according to the prescription of A method of DIN 75201; and a manufacturing method and use of the compositions.

16 Claims, No Drawings under the prior art and the object is to provide an olefinic thermoplastic elastomer composition superior in antifogging property (low hazing property).

LOW FOGGING THERMOPLASTIC ELASTOMER COMPOSITION AND MANUFACTURING METHOD AND USE OF SAME COMPOSITION

BACKGROUND OF THE INVENTION

The present invention relates to an olefinic thermoplastic elastomer composition, more particularly to an olefinic thermoplastic elastomer composition excellent in antifogging property (low hazing property) and the manufacturing method and use of the same composition.

An olefinic thermoplastic elastomer finds growing uses for automobile parts, industrial machinery parts, electric/electronic parts and constructional materials from the viewpoints of energy saving, resources saving and, recently, of global environmental protection, because it is light, can be easily recycled and besides generates no toxic gases upon incineration.

It is known that this thermoplastic elastomer may incorporate a mineral oil softening agent for the purpose of increasing flexibility and rubbery elasticity.

However, the olefinic thermoplastic elastomer incorporating a mineral oil softening agent poses the problem that, when it is used for interior materials of automobile and the like, it causes fogging phenomenon (a phenomenon that glass is blurred) in a prolonged use, and improvement of the problem has been desired.

Further, from the decorative aspect of automobile parts and the like, a thermoplastic elastomer having superior gloss has been desired.

OBJECTS AND SUMMARY OF THE INVENTION

The present invention is aimed at solving the problem as above-mentioned accompanying the prior art and the object is to provide an olefinic thermoplastic elastomer composition superior in antifogging property (low hazing property).

Namely, the present invention includes the following inventions.

(1) A perfectly or partially crosslinked olefinic thermoplastic elastomer composition comprising 10 to 90 parts by weight of a crystalline polyolefin (a), 90 to 10 parts by weight of an olefin-based copolymer rubber (b) (the total amount of the components (a) and (b) being 100 parts by weight) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt.

(2) A thermoplastic elastomer composition as defined in the above (1), wherein the mineral oil softening agent (c) has a viscosity index of 90 to 110.

(3) A thermoplastic elastomer composition as defined in the above (2), wherein the mineral oil softening agent (c) has a flash point of 200 to 290° C. and a pour point of −20 to −10° C.

(4) A thermoplastic elastomer composition as defined in any one of the above (1) to (3), wherein the crosslinking agent is an organic peroxide.

(5) A thermoplastic elastomer composition as defined in any one of the above (1) to (3), wherein the crosslinking agent is a phenolic curative.

(6) A thermoplastic elastomer composition as defined in the above (4) or (5), wherein the gel content is 98% or less.

(7) A thermoplastic elastomer composition as defined in any one of the above (1) to (6), wherein the haze value determined at a condition of 100° C. and 3 hours according to the prescription of A method of DIN 75201 is 3% or less.

(8) A method for manufacturing an olefinic thermoplastic elastomer composition, which comprises subjecting to dynamic heat treatment in the presence of a crosslinking agent 10 to 90 parts by weight of a crystalline polyolefin (a), 90 to 10 parts by weight of an olefin-based copolymer rubber (b) (the total amount of the components (a) and (b) being 100 parts by weight) and 3 to 100 parts by weight of a paraffinic mineral oil softening agent (c) having an evaporation loss of 0.4% by weight or less at a condition of 200 ° C., atmospheric pressure and 1 hour and having a kinetic viscosity (40° C.) of 50 to 250 cSt.

(9) An olefinic thermoplastic elastomer composition obtainable according to the manufacturing method as defined in the above (8).

(10) A perfectly or partially crosslinked olefinic thermoplastic elastomer composition comprising 10 to 90 parts by weight of a crystalline polypropylene resin (a'), 90 to 10 parts by weight of an olefin-based copolymer rubber (b) (the total amount of the components (a') and (b) being 100 parts by weight), 3 to 30 parts by weight of a polyethylene resin (d) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt.

(11) A thermoplastic elastomer composition as defined in any one of the above (1) to (7), (9) and (10) which is obtainable by static heat treatment, subsequent to the dynamic heat treatment, under the following conditions:

$$Q \geq 0.1 \text{ and } t \geq 2^{-(T-110)/10}$$

wherein Q is a quantity (m$^3$/(hour·kg)) of hot air supplied upon drying per the unit weight of the substance to be treated, t is a heat treatment time (hour) and T is a temperature (° C.) of the hot air just before hitting the substance to be treated.

(12) An electric apparatus or transporting machine including a member comprising a thermoplastic elastomer composition as defined in any one of the above (1) to (7), (9) and (10) and a member comprising glass.

(13) An electric apparatus or transporting machine as defined in the above (12), wherein the member comprising a thermoplastic elastomer composition and the member comprising glass are installed within a same enclosed space.

(14) An electric apparatus or transporting machine as defined in the above (12), wherein the member comprising a thermoplastic elastomer composition and the member comprising glass are installed 1 meter or less apart at the most adjacent portion.

(15) An olefinic thermoplastic elastomer composition which is obtainable by dynamically heat treating a mixture including 40 to 85 parts by weight of an ethylene-based copolymer rubber (A), 60 to 15 parts by weight of an olefinic resin (B) and 45 parts by weight or less of a softening agent (C) (the total amount of the components (A), (B) and (C) being 100 parts by weight) in the presence of a crosslinking agent and which gives a gloss value of 80% or more and a haze value of 10% or less on glass plate when subjected to the fogging test at a condition of 100° C. and 3 hours according to the prescription of A method of DIN 75201 using 10 g of the pellets.

(16) A thermoplastic elastomer composition as defined in the above (15) which is obtainable by static heat treatment, subsequent to the dynamic heat treatment, under the following conditions:

$$Q \geq 0.1 \text{ and } t \geq 2^{-(T-110)/10}$$

wherein Q is a quantity (m³/(hour·kg)) of hot air supplied upon drying per the unit weight of the substance to be treated, t is a heat treatment time (hour) and T is a temperature (° C.) of the hot air just before hitting the substance to be treated.

(17) A thermoplastic elastomer composition as defined in the above (15) or (16), wherein the crosslinking agent is a bifunctional organic peroxide having two peroxide bonds in one molecule and the decomposition product thereof, diol, remains in the pellets in a concentration of 30 ppm or less.

(18) A thermoplastic elastomer composition which is obtainable by static heat treatment, subsequent to the dynamic heat treatment, under the following conditions:

$$Q \geq 0.1 \text{ and } t \geq 2^{-(T-110)/10}$$

wherein Q is a quantity (m³/(hour·kg)) of hot air supplied upon drying per the unit weight of the substance to be treated, t is a heat treatment time (hour) and T is a temperature (° C.) of the hot air just before hitting the substance to be treated.

(19) A molding obtainable by molding a thermoplastic elastomer composition as defined in any one of the above (15) to (18).

(20) Moldings as defined in the above (19) which are interior parts for automobile.

(21) A method for manufacturing an olefinic thermoplastic elastomer composition, which comprises subjecting a mixture including 40 to 85 parts by weight of an ethylene-based copolymer rubber (A), 60 to 15 parts by weight of an olefinic resin (B) and 45 parts by weight or less of a softening agent (C) [the total amount of the components (A), (B) and (C) being 100 parts by weight] to dynamic heat treatment in the presence of a crosslinking agent and to subsequent static heat treatment under the following conditions:

$$Q \geq 0.1 \text{ and } t > 2^{-(T-110)/10}$$

wherein Q is a quantity (m³/(hour·kg)) of hot air supplied upon drying per the unit weight of the substance to be treated, t is a heat treatment time (hour) and T is a temperature (° C.) of the hot air just before hitting the substance to be treated.

The thermoplastic elastomer composition of the first invention in the present application is constituted by a crystalline polyolefin (a), an olefin-based copolymer rubber (b) and a paraffinic mineral oil softening agent (c) having an evaporation loss of 0.4% by weight or less at a condition of 200° C., atmospheric pressure and 1 hour and having a kinetic viscosity (40° C.) of 50 to 250 cSt.

[Crystalline Polyolefin (a)]

As the crystalline polyolefin used in the present invention, there are enumerated homopolymers or copolymers of α-olefin having 2 to 20 carbon atoms.

The above-mentioned α-olefin includes, concretely, ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene.

Concrete examples of the above crystalline polyolefin include the following (co)polymers.
(1) Homopolymers of ethylene
(2) Copolymers of ethylene with other α-olefin or with vinyl monomer, such as vinyl acetate and ethyl acrylate, in a molar ratio of 10 mole % or less
(3) Homopolymers of propylene
(4) Random copolymers of propylene and other α-olefin in a molar ratio of 10 mole % or less
(5) Block copolymers of propylene and other α-olefin in a molar ratio of 30 mole % or less
(6) Homopolymers of 1-butene
(7) Random copolymers of 1-butene and other α-olefin in a molar ratio of 10 mole % or less
(8) Homopolymers of 4-methyl-1-pentene
(9) Random copolymers of 4-methy-1-pentene and other α-olefin in a molar ratio of 20 mole % or less.

The crystalline polypropylene resin (a') used as the crystalline polyolefin indicates the polymers described in the above (3), (4) and (5).

The above crystalline polyolefin may be used alone or in a combination of two or more.

[Olefin-Based Copolymer Rubber (b)]

The olefin-based copolymer rubber used in the first invention of the present application is an amorphous, random, elastic copolymer having α-olefin of 2 to 20 carbon atoms as the predominant component, and includes amorphous α-olefin copolymers comprising two or more α-olefins and α-olefin-non-conjugated diene copolymers comprising two or more α-olefins and non-conjugated diene.

As concrete examples of such olefin-based copolymer rubbers, there are enumerated the following rubbers.
(1) Rubbers of ethylene-α-olefin copolymer

[Ethylene/α-olefin (molar ratio)=about 90/10 to 50/50]
(2) Rubbers of ethylene-α-olefin-non-conjugated diene copolymer

[Ethylene/α-olefin (molar ratio)=about 90/10 to 50/50]
(3) Rubbers of propylene-α-olefin copolymer

[Propylene/α-olefin (molar ratio)=about 90/10 to 50/50]
(4) Rubbers of butene-α-olefin copolymer

[Butene/α-olefin (molar ratio)=about 90/10 to 50/50]

As the above-mentioned α-olefin, there are enumerated, concretely, the same as those given as the concrete examples of α-olefins constituting the above crystalline polyolefin.

As the above-mentioned non-conjugated diene, there are enumerated, concretely, cyclic dienes such as dicyclopentadiene, cyclooctadiene, methylenenorbornene (e.g. 5-methylene-2-norbornene), ethylidenenorbornene (e.g. 5-ethylidene-2-norbornene), methyltetrahydroindene, 5-vinyl-2-norbornene, 5-isopropylidene-2-norbornene, 6-chloromethyl-5-isopropenyl-2-norbornene and norbonadiene; and chain dienes such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene and 7-methyl-1,6-octadiene.

The Mooney viscosity $ML_{1+4}$ (100° C.) of these copolymer rubbers is usually 10 to 250, preferably 40 to 220. The iodine value is, if the above non-conjugated diene is copolymerized, preferably 25 or less.

The olefin-based copolymer rubber mentioned above may be present in any crosslinked state, i.e., un-crosslinked state, partially crosslinked state and perfectly crosslinked state, in the thermoplastic elastomer. In the first invention of the present application, however, it is necessary to be present in a perfectly crosslinked or partially crosslinked state.

In the first invention of the present application, as the rubber component there may be used other rubbers, other than the above olefin-based copolymer rubbers, for example, diene type rubbers such as styrene-butadiene rubbers (SBR), acrylonitrile-butadiene rubbers (NBR), natural rubbers (NR) and butyl rubbers (IIR); SEBS; and polyisobutylene.

In the thermoplastic elastomer composition according to the first invention of the present application, the formulation amount of the crystalline polyolefin (a) is 10 to 90 parts by weight, preferably 10 to 70 parts by weight to the total 100 parts by weight of the crystalline polyolefin (a) and the olefin-based copolymer rubber (b).

Further, when a combination of the olefin-based copolymer rubber (b) and other rubber is employed as the rubber component, the other rubber is incorporated usually in a proportion of 40 parts by weight or less, preferably 20 parts by weight or less per the total 100 parts by weight of the crystalline polyolefin (a) and the rubber component, and the crystalline polyolefin (a) is incorporated usually in a proportion of 10 to 90 parts by weight, preferably 10 to 70 parts by weight to the total 100 parts by weight of the crystalline polyolefin (a) and the whole rubber component.

As the thermoplastic elastomer composition of the first invention of the present application, preferred is one wherein the crystalline polyolefin (a) is a crystalline polypropylene, wherein the olefin-based copolymer rubber (b) is an ethylene-α-olefin copolymer rubber or an ethylene-α-olefin-non-conjugated diene copolymer rubber, and present in a partially crosslinked state in the thermoplastic elastomer, and wherein the formulation ratio by weight of the crystalline polypropylene to the whole rubber component (crystalline polypropylene/rubber) is in the range from 70/30 to 10/90.

As the thermoplastic elastomer composition of the first invention of the present application, there may also be used a perfectly or partially crosslinked olefinic thermoplastic elastomer composition which comprises 10 to 90 parts by weight of a crystalline polypropylene resin (a'), 90 to 10 parts by weight of an olefin-based copolymer rubber (b) (the total amount of (a') and (b) being 100 parts by weight), 3 to 30 parts by weight, preferably 5 to 20 parts by weight of a polyethylene resin (d) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt.

The polyethylene resin (d) indicates (i) homopolymers of ethylene and (ii)copolymers of ethylene with other α-olefin or with vinyl monomer, such as vinyl acetate and ethyl acrylate, in a molar ratio of 10 mole % or less.

In the first invention of the present application, in order to obtain excellent antifogging property (low hazing property) and gloss, a paraffinic mineral oil softening agent (c), one having an evaporation loss of 0.4% by weight or less at a condition of 200° C., atmospheric pressure and 1 hour and having a kinetic viscosity (40° C.) of 50 to 250 cSt, is incorporated in an amount of 3 to 100 parts by weight, favorably 5 to 80 parts by weight to the total 100 parts by weight of the crystalline polyolefin (a) (or crystalline polypropylene resin (a')) and the olefin-based copolymer rubber (b). When an olefin-based copolymer rubber (b) and other rubber are used conjointly as the rubber component, the above mineral oil softening agent (c) is incorporated usually in a ratio of 3 to 100 parts by weight, favorably 5 to 80 parts by weight to the total 100 parts by weight of the crystalline polyolefin (a) (or crystalline polypropylene resin (a')) and the rubber component.

The above-mentioned mineral oil softening agent (c) preferably has a viscosity index of 90 to 110, a flash point of 200 to 290° C., a pour point of −20 to −10° C. and a density of 0.85 to 0.90 g/cm³ from the viewpoint of long-term storage stability and gloss.

The thermoplastic elastomer composition of the first invention of the present application may incorporate, where deemed necessary, additives such as heat stabilizer, antistatic agent, weather resisting agent, age resistor, filler, colorant and lubricant, within the extent not obstructing the purpose of the first invention of the present application.

Favorable concrete examples of the thermoplastic elastomer composition in the first invention of the present application include a thermoplastic elastomer which is obtained by mixing 10 to 70 parts by weight of a crystalline polypropylene (a), 90 to 30 parts by weight of a rubber (b) comprising an ethylene-propylene copolymer rubber or an ethylene-propylene-diene copolymer rubber [the total sum of the components (a) and (b) being 100 parts by weight] and 5 to 80 parts by weight of the above mineral oil softening agent (c) and obtained by subjecting the mixture to dynamic heat treatment in the presence of an organic peroxide or a phenolic curative to make the crosslinking of the rubber(b) take place.

The organic peroxide used as the crosslinking agent includes, concretely, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of odor and scorch stability preferred are 2,5-dimethyl-2,5-di-(tert-butylperoxy)hexane, 2,5-dimethyl-2,5-di-(tert-butylperoxy)hexyne-3, 1,3-bis (tert-butylperoxyisopropyl)benzene, 1,1-bis(tert-butylperoxy)-3,3,5-trimethylcyclohexane and n-butyl 4,4-bis(tert-butylperoxy)valerate. Among these, 2,5-dimethyl-2,5-di-(tert-butylperoxy)hexane and 1,3-bis(tert-butylperoxyisopropyl)benzene are most preferable.

In the first invention of the present application, the organic peroxide is used in a ratio of usually 0.05 to 3 parts by weight, preferably 0.1 to 1 part by weight to the total 100 parts by weight of the crystalline polyolefin, whole rubber component and mineral oil softening agent.

Upon crosslinking treatment by the above organic peroxides, there can be incorporated crosslinking aids such as sulfur, p-quinone dioxime, p,p'-dibenzoylquinone dioxime, N-methyl-N-4-dinitrosoaniline, nitrosobenzene, diphenylguanidine, trimethylolpropane, N,N'-m-phenylene dimaleimide, divinylbenzene and triallyl cyanurate, polyfunctional methacrylate monomers such as ethylene glycol dimethacrylate, diethyleneglycol dimethacrylate, polyethylene glycol dimethacrylate, trimethylolpropane trimethacrylate and allyl methacrylate, and polyfunctional vinyl monomers such as vinyl butyrate and vinyl stearate.

By using the above compounds, uniform and mild crosslinking reaction can be expected. Particularly, in the first invention of the present application, divinylbenzene is most preferable. Divinylbenzene, since being easy to handle, since being good in compatibility with the crystalline polyolefin and the olefin-based copolymer rubber which consitute the main component for crosslinking treatment, and since having a function of dissolving organic peroxides to work as a dispersant thereof, produces the effect that the crosslinking by heat treatment is uniform to result in a thermoplastic elastomer composition balanced in flow and physical properties.

The compounds such as the above-mentioned crosslinking aids or polyfunctional vinyl monomers are used usually in a ratio of 0.1 to 2 parts by weight, preferably 0.3 to 1 part by weight to 100 parts by weight of the whole to be crosslinked from the standpoints of providing good flow property for the obtained thermoplastic elastomer and preventing change in the physical properties from taking place by heat history at the time of the molding/processing.

The phenolic curative used as crosslinking agent indicates vulcanizing agents including phenolic curing resins, and preferably enumerated is a phenolic curative system which comprises phenolic curing resins and cure activators as disclosed in U.S. Pat. No. 4,311,628.

A basic ingredient of the above-mentioned system is a phenolic curing resin made by condensation of substituted phenol (e.g., halogen substituted phenol, $C_1$ to $C_2$ alkyl substituted phenol) or unsubstituted phenol with an aldehyde, preferably, formaldehyde in an alkali medium or by condensation of bifunctional phenoldialcohols (preferably, dimethylol phenols substituted in the para-position with $C_5$ to $C_{10}$ alkyl groups). Halogenated alkyl substituted phenol curing resins prepared by halogenation of alkyl substituted phenol curing resin are especially suitable. Phenolic curative systems comprising methylol phenolic curing resins, halogen donor and metal compounds are especially recommended, details of which are described in the specifications of U.S. Pat. Nos. 3,287,440 and 3,709,840. Non-halogenated phenolic curing resins are used in conjunction with halogen donors, preferably, along with a hydrogen halide scavenger. Ordinarily, halogenated, preferably brominated, phenolic curing resins containing 2 to 10% by weight bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the crosslinking function of the phenolic curing resin, however, with rubbers which do not readily cure with phenolic curing resins, the conjoint use of a halogen donor and zinc oxide is recommended. The preparation of halogenated phenolic curing resins and their use in a curative system with zinc oxide are described in the specifications of U.S. Pat. Nos. 2,972,600 and 3,093,613, the disclosure of which along with the disclosure of the above U.S. Pat. Nos. 3,287,440 and 3,709,840 are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the crosslinking efficiency of the phenolic curing resin and includes metal oxides and halogen donors either used alone or conjointly. For further details of phenolic curative systems see "Vulcanization and Vulcanizing agents", W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers.

The above-mentioned phenolic curatives are preferable curatives from the viewpoint of prevention of fogging, since they generate little decomposition products thereof.

The phenolic curatives are used in sufficient quantities to achieve essentially complete cure of the rubber.

The amount to be used of the phenolic curatives is, in terms of an amount of phenolic curing resin, usually 0.5 to 10 parts by weight, preferably 0.5 to 5 parts by weight, more preferably 1 to 5 parts by weight to the total 100 parts by weight of the crystalline polyolefin, whole rubber component and mineral oil softening agent.

The above word "dynamic heat treatment" means a technical measure, in which a composition comprising each component mentioned above is melt-kneaded, namely, kneaded in a molten state.

As the kneading apparatus there are used a heretofore known kneading apparatus, for example, an open type apparatus such as mixing roll or a non-open type apparatus such as Bumbury's mixer, extruder, kneader and continuous mixer. Among these, a non-open type kneading apparatus is preferable and the kneading is preferably performed in an inert atmosphere, such as nitrogen gas and carbon dioxide gas.

The kneading may favorably be conducted at a temperature to make the half life of the organic peroxide to be used at a time shorter than one minute, usually in the range from 150 to 280° C., preferably from 170 to 240° C. for duration in the range usually from 1 to 20 minutes, preferably 1 to 10 minutes. The shearing force to be applied, in terms of the shearing velocity, is determined within the range from 10 to 50,000 $sec^{-1}$, preferably from 100 to 20,000 $sec^{-1}$.

In manufacturing the olefinic thermoplastic elastomer composition according to the first invention of the present application, it is preferable to conduct static heat treatment in hot air after the above-mentioned dynamic heat treatment. The term "static heat treatment" as used herein indicates a technical measure wherein a subject is kept for a given hour at a temperature of its melting point or lower in the state of its being stood still or stirred.

At that time, by conducting the static heat treatment under the following conditions:

$$Q \geq 0.1 \text{ and } t \geq 2^{-(T-110)/10}$$

wherein Q is a quantity ($m^3$/(hour·kg)) of hot air supplied upon drying per the unit weight of the substance to be treated, t is a heat treatment time (hour) and T is a temperature (° C.) of the hot air just before hitting the substance to be treated, most of low molecular weight components are removed to result in affording an olefinic thermoplastic elastomer composition better in antifogging property.

The thermoplastic elastomer composition of the first invention in the present application is preferably one which is partially crosslinked. The word "partially crosslinked" means the case where the gel content determined according to the method described below is in the range from 20 to 98% by weight, while "perfectly crosslinked" means the case where the gel content is over 98% by weight. In the first invention of the present application, the gel content is preferably within the range from 40 to 98% by weight.

[Measurement of Gel Content]

A thermoplastic elastomer composition sample 100 mg is weighed, cut into small pieces of 0.5 mm×0.5 mm×0.5 mm. The obtained small pieces are immersed in 30 ml cyclohexane in a closed container at 23° C. for 48 hours, then taken out on a filter paper and dried at room temperature for 72 hours or more until a constant weight is obtained. From the weight of the residue after drying there are subtracted the weights of all the cyclohexane insoluble components (fibrous filler, filler, pigment, etc.) other than the polymer component and the weight of the crystalline polyolefin in the sample before cyclohexane immersion. The value obtained thus is named "corrected final weight (Y)".

On the other hand, the weight of the rubber in the sample is named "corrected initial weight (X)".

The gel content (cyclohexane insoluble components) is obtained by the following formula.

Gel content [% by weight]=[corrected final weight (Y)/corrected initial weight (X)]×100

The thermoplastic elastomer composition of the first invention in the present application is superior inflow property in high temperature and extrusion moldability since it comprises a crystalline polyolefin, a rubber and a mineral oil softening agent, and therefore it can be subjected to compression molding, transfer molding, injection molding, extrusion molding and the like, using the hitherto used molding equipment.

The thermoplastic elastomer composition of the first invention of the present application is excellent in antifogging property (low hazing property) and gloss.

The thermoplastic elastomer composition of the first invention of the present application usually has a haze value of 3% or less at a condition of 100° C. and 3 hours.

According to the first invention of the present application, an olefinic thermoplastic elastomer composition is obtainable which is excellent in flexibility and rubbery elasticity and additionally excellent in antifogging property and gloss.

[Electric Apparatus and Transporting Machine According to the Present Invention]

The fogging phenomenon the present invention is to solve occurs when an olefinic thermoplastic elastomer composition containing a softening agent and glass exist concurrently. For electric apparatus such as home electric appliance, information treating instrument, communication apparatus and measuring device, overland transporting machine such as automobile, and transporting machine such as aircraft and vessel, an olefinic thermoplastic elastomer composition containing a softening agent and glass are often used jointly. Accordingly, the effect of the present invention is particularly remarkable in the electric apparatus or transporting machine which comprises a member comprising the thermoplastic elastomer composition of the first invention of the present application and a member comprising glass.

In electric apparatus or transporting machine, a member comprising a thermoplastic elastomer composition and a member comprising glass are often installed within a same enclosed space, as the inside of automobile and the portion near window of window-provided home electric appliance are examples of the above. When both members are installed within a same enclosed space, occurrence of the fogging phenomenon is especially feared because substances causing the fogging are not discharged into the outside. Accordingly, the effect of the present invention is particularly remarkable in the electric apparatus or transporting machine wherein a member comprising the thermoplastic elastomer composition of the first invention of the present application and a member comprising glass are installed within a same enclosed space.

Further, in electric apparatus or transporting machine, a member comprising a thermoplastic elastomer composition and a member comprising glass are often installed closely. The examples of this case include the vicinity of automobile doors and the vicinity of the indication portions of home electric appliances provided with indication portion such as display and meter. When both members are installed closely, fear for occurrence of the fogging phenomenon is especially enhanced because substances causing the fogging reach to a member comprising glass comparatively without being diffused. Accordingly, the effect of the present invention is particularly remarkable in the electric apparatus or transporting machine wherein a member comprising the thermoplastic elastomer composition of the first invention of the present application and a member comprising glass are installed closely.

Here, the term "closely" means a condition wherein both members are installed 1 m or less apart from each other at the most adjacent portion. The effect of the present invention is more remarkable as the distance of the both members becomes closer, and it is especially remarkable in electric apparatus or transportation machine wherein the both members are installed 0.5 m or less, particularly 0.2 m or less apart.

The thermoplastic elastomer composition of the second invention in the present application is obtainable by subjecting a mixture including an ethylene-based copolymer rubber (A), an olefinic resin (B) and an optionally added softening agent (C) to dynamic heat treatment in the presence of a crosslinking agent.

The thermoplastic elastomer composition of the third invention in the present application is obtained by static heat treatment, subsequent to the dynamic heat treatment, under the following conditions:

$$Q \geq 0.1 \text{ and } t \geq 2^{-(T-110)/10}$$

wherein Q is a quantity ($m^3$/(hour·kg)) of hot air supplied upon drying per the unit weight of the substance to be treated, t is a heat treatment time (hour) and T is a temperature (° C.) of the hot air just before hitting the substance to be treated.

[Ethylene-Based Copolymer Rubber (A)]

The ethylene-based copolymer rubber (A) used in the second invention of the present application is an elastic copolymer rubber having ethylene and α-olefin of 3 to 20 carbon atoms as the predominant component, and preferably includes amorphous, random elastic copolymer rubbers comprising ethylene and α-olefin of 3 to 20 carbon atoms and amorphous, random elastic copolymer rubbers comprising ethylene, α-olefin of 3 to 20 carbon atoms and non-conjugated polyene.

As the above-mentioned α-olefin, there are enumerated, concretely, propylene, 1-butene, 1-pentene, 1-hexene, 1-octene, 1-decene, 2-methyl-1-propene, 3-methyl-1-pentene, 4-methyl-1-pentene and 5-methyl-1-hexene. These α-olefins are used alone or as a mixture of two or more.

The molar ratio of ethylene to the α-olefin having 3 to 20 carbon atoms in the ethylene-based copolymer rubber (A) is usually 55/45 to 85/15, preferably 60/40 to 83/17.

As the above-mentioned non-conjugated polyene, there are enumerated, concretely, cyclic dienes such as dicyclopentadiene, cyclooctadiene, methylenenorbornene (e.g. 5-methylene-2-norbornene), ethylidenenorbornene (e.g. 5-ethylidene-2-norbornene), methyltetrahydroindene, 5-vinyl-2-norbornene, 5-isopropylidene-2-norbornene, 6-chloromethyl-5-isopropenyl-2-norbornene and norbornadiene;

and chain dienes such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene and 7-methyl-1,6-octadiene; and trienes such as 2,3-diisopropylidene-5-norbornene and 2-ethylidene-3-isopropylidene-5-norbornene. Of these non-conjugated polyenes, 5-ethylidene-2-norbornene, dicyclopentadiene and 1,4-hexadiene are preferable, wherein 5-ethylidene-2-norbornene is more preferable.

As the ethylene-based copolymer rubber (A), preferable are ethylene-propylene-non-conjugated diene copolymer rubbers and ethylene-1-butene-non-conjugated diene copolymer rubbers. The ethylene-propylene-non-conjugated diene rubbers, among these, ethylene-propylene-5-ethylidene-2-norbornene copolymer rubbers are particularly preferable in the point that a thermoplastic elastomer composition having a moderately crosslinked structure is obtainable.

The Mooney viscosity $ML_{1+4}$ (100° C.) of the ethylene-based copolymer rubber (A) is usually 50 to 300, preferably 100 to 160.

The iodine value of the ethylene-based copolymer rubber (A) is usually 3 to 30, preferably 5 to 25. That the iodine value of the ethylene-based copolymer rubber (A) is in such a range gives a thermoplastic elastomer composition crosslinked in good balance and superior in moldability and rubbery elasticity.

The formulation amount of the ethylene-based copolymer rubber (A) is 40 to 85 parts by weight, preferably 60 to 80 parts by weight to the total 100 parts by weight of the ethylene-based copolymer rubber (A), olefinic resin (B) and optionally incorporated other components.

In the second invention of the present application, as the rubber component, in addition to the ethylene-based copolymer rubber (A), there can be employed rubbers other than the ethylene-based copolymer rubber (A), such as styrene-butadiene rubber or hydrogenated product thereof, styrene-isoprene rubber or hydrogenated product thereof, nitrile rubber, butyl rubber, natural rubber and silicone rubber, within the extent not obstructing the purpose of the second invention of the present application. Here, "hydrogenated product" means a product in which all or part of the double bonds are saturated through hydrogen addition treatment.

[Olefinic Resin (B)]

The olefinic resin (B) used in the second invention of the present application comprises a high molecular weight solid product usually obtained by polymerizing one kind or two kinds or more of monoolefin(s) by high pressure method or low pressure method. As such resins there are given, for example, isotactic and syndiotactic monoolefin polymer resins. The resins representative of these are commercially available.

The suitable raw material olefins for the above olefinic resin (B) include preferably α-olefins having 2 to 20 carbon atoms and, concretely, there are enumerated ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins are used alone or in a mixture of two or more. The polymerization mode may either be random mode or block mode as long as a resinous product is produced. These olefinic resins may be used alone or in a combination of two or more.

Among these olefinic resins, propylene type polymers, if mentioned concretely, propylene homopolymers, propylene-ethylene block copolymers, propylene-ethylene random copolymers, propylene-ethylene-butene random copolymers and ethylene-4-methyl-1-pentene random copolymers are particularly preferable.

The olefinic resin (B) used in the second invention of the present application has a MFR (ASTM D1238-65T, 230° C., 2.16 kg load) in the range usually from 0.01 to 100 g/10 min., preferably from 0.05 to 50 g/10 min.

The above-mentioned olefinic resin (B) has a role of improving flow property and heat resistance of the composition.

In the second invention of the present application, the formulation amount of the olefinic resin (B) is 15 to 60 parts by weight, favorably 20 to 50 parts by weight to the total sum 100 parts by weight of the ethylene-based copolymer rubber (A), olefinic resin (B) and optionally used other components. Using the olefinic resin (B) in a proportion as mentioned above gives a thermoplastic elastomer composition excellent in flexibility and rubbery elasticity and moreover excellent in moldability/processability.

[Softening Agent (C)]

In the second invention of the present application, a softening agent (C) may be used, if need be. The softening agent may be oil extended in the ethylene-based copolymer rubber (A) or added later without performing oil extension.

As the softening agents, those usually used for rubber can be employed and, concretely, there are enumerated petroleum softening agents, such as process oil, lubricating oil, paraffin oil, liquid paraffin, petroleum asphalt and vaseline; coal tar softening agents, such as coal tar and coal tar pitch; fatty oil, such as castor oil, linseed oil, rape oil, soybean oil and coconut oil; tall oil; waxes, such as beeswax, carnauba wax and lanolin; fatty acids and metal salts thereof, such as ricinolic acid, palmitic acid, stearic acid, barium stearate, calcium stearate and zinc laurate; synthetic high molecular weight substances, such as terpene resin, petroleum resin, coumarone-indene resin and a tactic polypropylene; ester softening agents, such as dioctyl phthalate, dioctyl adipate and dioctyl sebacate; microcrystalline wax, rubber substitute (factice), liquid polybutadiene, modified liquid polybutadiene and liquid Thiokol™. Among these softening agents, preferred are paraffinic process oils, and particularly preferred are high viscosity type paraffinic process oils which contain volatile low molecular weight components in a less quantity. Here, the high viscosity type indicates oils having a kinetic viscosity at 40° C. in the range from 200 to 1000 cSt.

In the second invention of the present application, the formulation amount of the softening agent should be 45 parts by weight or less, preferably 5 to 40 parts by weight, more preferably 10 to 30 parts by weight to the total 100 parts by weight of the ethylene-based copolymer rubber (A), olefinic resin (B) and other components used according to necessity, when the heat resistance of the obtained thermoplastic elastomer composition is taken into consideration.

In the case of post-addition without performing oil extension, the formulation amount of the softening agent (including the oil extended softening agent) is usually 100 parts by weight or less, favorably 3 to 80 parts by weight, more favorably 5 to 50 parts by weight to the total 100 parts by weight of the ethylene-based copolymer rubber (A) and olefinic resin (B).

When the softening agent is used in a ratio as above-mentioned, the obtained thermoplastic elastomer composition shows excellent flow property at the time of molding, and the mechanical properties of the moldings obtained therefrom does not drop.

[Other Components]

The thermoplastic elastomer composition of the second invention in the present application may incorporate an inorganic filler and the like in addition to the ethylene-based copolymer rubber (A), olefinic resin (B) and softening agent (C).

Concrete examples of the inorganic filler may include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, shirasu balloon, basic magnesium sulfate whisker, calcium titanate whisker and aluminum borate whisker.

In the second invention of the present application, the inorganic filler is used in a proportion, from the viewpoint of rubber elasticity and moldability/processability of the obtained thermoplastic elastomer composition, of usually 100 parts by weight or less, preferably 2 to 30 parts by weight to the total 100 parts by weight of the ethylene-based copolymer rubber (A), olefinic resin (B) and optionally used other components.

The thermoplastic elastomer composition of the second invention of the present application may incorporate the hitherto known heat stabilizer, age resistor, weather resisting agent, anti-static agent and lubricant such as metal soap and wax, and the like within the extent not obstructing the purpose of the second invention of the present application.

The thermoplastic elastomer composition of the second invention in the present application is obtained by blending the above-mentioned ethylene-based copolymer rubber (A), olefinic resin (B), and softening agent and/or inorganic filler incorporated if necessary, and then by subjecting the mixture to dynamic heat treatment in the presence of a crosslinking agent. Here, the phrase "dynamic heat treatment" means kneading in a molten state.

As the crosslinking agent used in the second invention of the present application, there are enumerated crosslinking agents generally used in the thermosetting type rubber, such as organic peroxide, phenolic curative, sulfur, hydrosilicone compound, amino resin, quinone and its derivatives, amine compound, azo compound, epoxy compound and isocyanate. Among these crosslinking agents an organic peroxide is particularly preferable.

The organic peroxide used in the second invention of the present application includes, concretely, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of reactivity, odor and scorch stability preferred are bifunctional organic peroxides having two peroxide bonds (—O—O—) in one molecule, such as 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate. Among these, 2,5-dimethyl-2,5-di-(tert-butylperoxy)hexane is most preferable.

Such an organic peroxide is used in an amount, from the standpoint of heat resistance, tensile properties, rubbery elasticity and moldability of the obtained thermoplastic elastomer composition, to make usually 0.02 to 3 parts by weight, preferably 0.05 to 1 part by weight to the total 100 parts by weight of the ethylene-based copolymer rubber (A), olefinic resin (B) and optionally used other components.

Upon crosslinking treatment by the above organic peroxide, there can be incorporated crosslinking aids such as sulfur, p-quinone dioxime, p,p'-dibenzoylquinone dioxime, N-methyl-N-4-dinitrosoaniline, nitrosobenzene, diphenylguanidine, trimethylolpropane, N,N'-m-phenylene dimaleimide, divinylbenzene and triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

By using the above compounds, uniform and mild crosslinking reaction can be expected. Particularly, in the second invention of the present application, divinylbenzene is most preferable. Divinylbenzene, since being easy to handle, since being good in compatibility with the ethylene-based copolymer rubber (A) and the olefinic resin (B) which constitute the main component for crosslinking treatment, and since having a function of dissolving organic peroxides to work as a dispersant thereof, produces the effect that the crosslinking by heat treatment is uniform to result in a thermoplastic elastomer composition balanced in flow and physical properties.

The compounds such as the above-mentioned crosslinking aids or polyfunctional vinyl monomers are used usually in an amount of 5 parts by weight or less, preferably 0.3 to 3 parts by weight to the total 100 parts by weight of the ethylene-based copolymer rubber (A), olefinic resin (B), and other components used if necessary.

To accelerate the decomposition of the organic peroxide, there can be used such decomposition accelerators as tertiary amines such as triethylamine, tributylamine and 2,4,6-tri(dimethylamino) phenol and naphthenates of aluminum, cobalt, vanadium, copper, calcium, zirconium, manganese, magnesium, lead, mercury and the like.

The dynamic heat treatment in the second invention of the present application is preferably conducted in a non-open type apparatus and in an inert atmosphere, such as nitrogen gas and carbon dioxide gas. The temperature of the heat treatment is in the range from the melting point of the olefinic resin (B) to 300° C., usually 150 to 270° C., preferably 170 to 250° C. The kneading time is usually 1 to 20 minutes, preferably 1 to 10 minutes. The shearing force to be applied, in terms of the shearing velocity, is in the range from 10 to 50,000 $sec^{-1}$, preferably from 100 to 20,000 $sec^{-1}$.

As the kneading apparatus there can be used a mixing roll, intensive mixer (for example, Bumbury's mixer, kneader) and single screw or twin screw extruder, wherein preference is given to a non-open type apparatus, particularly to a twin screw extruder.

In manufacturing the olefinic thermoplastic elastomer composition according to the second invention of the present application, it is preferable to conduct static heat treatment in hot air after the above-mentioned dynamic heat treatment. Here, "static heat treatment" indicates to keep a subject material for a given hour at a temperature of its melting point or lower with it being stood still or stirred.

At that time, by conducting the static heat treatment under the following conditions:

$$Q \geq 0.1 \text{ and } t \geq 2^{-(T-110)/10}$$

wherein Q is a quantity (m³/(hour·kg)) of hot air supplied upon drying per the unit weight of the substance to be treated, t is a heat treatment time (hour) and T is a temperature (° C.) of the hot air just before hitting the substance to be treated, most of low molecular weight components are removed to result in affording an olefinic thermoplastic elastomer composition better in antifogging property.

Further, in the case of using the above-mentioned bifunctional organic peroxide as crosslinking agent, it is preferable in the viewpoint of the antifogging property that the residual amount of diol, a decomposition product of the peroxide, is made 30 ppm or less by the above dynamic heat treatment and/or static heat treatment.

Thus, there can be obtained a thermoplastic elastomer composition good in the antifogging property, which has a gloss value on glass plate of 80% or more, preferably 85% or more and a haze value of 10% or less, preferably 7% or less when the fogging test is carried out, using log pellets, at a condition of 100° C. and 3 hours according to A method of DIN (Deutsche Industrie Norm) 75201.

[Interior Parts for Automobile]

The moldings of the present invention are obtainable by molding a thermoplastic elastomer composition of the second or the third invention of the present application and most suitably used for automobile interior parts.

The automobile interior parts of the present invention are usually produced according to the ordinary methods mentioned hereinafter.

(1) By molding in to a desired shape, for example, into a sheet-like shape using a plastics processing machine such as T-die equipped extruder and calender machine.
(2) By molding into a desired shape with injection molding.

The automobile interior parts so-obtained may include 20 to 200 parts by weight of an olefin type resin per 100 parts by weight of the above-mentioned olefinic thermoplastic elastomer composition. The olefin type resin used herein may be the same as the olefinic resin used in the manufacture of the above-mentioned olefinic thermoplastic elastomer composition. Particularly preferred are low density polyethylene, linear low density polyethylene, polypropylene, propylene-ethylene block copolymer, polybutene-1 and crystalline ethylene-α-olefin copolymer (such as ethylene-4-methyl-1-pentene random copolymer.)

For the skin layer of the automobile interior parts of the present invention, a surface layer may be provided which comprises at least one material selected from polyurethane, saturated polyester, acrylate resin, poly(vinyl chloride) and isocyanate resin.

The saturated polyester used to form such a surface layer may include poly(ethylene terephthalate), poly(butylene terephthalate) and derivatives thereof. The acrylate resin may include poly(methyl (meth)acrylate), poly(isobutyl (meth)acrylate), poly(2-ethylhexyl (meth)acrylate). Further, the isocyanate resin may include poly(hexamethylene diisocyanate) and poly(isophorone diisocyanate).

Such a surface layer is desirably 300 μm or less thick. And a primer layer may lie between the skin layer and such a surface layer.

The automobile interior parts of the present invention may be laminated products constituted in conjunction with a polyolefin foamed product or a polyolefin resin. The polyolefin used here may be the same as the olefinic resin used in the manufacture of the above-mentioned olefinic thermoplastic elastomer composition. Particularly, polyethylene and polypropylene and the like are preferable.

Such a laminate is manufactured, for example, by a process wherein the olefinic thermoplastic elastomer composition is extruded with a T-die equipped extruder and the extruded molten sheet-like thermoplastic elastomer composition is passed through a pair of rolls in the state of its being laminated with a polyolefin foamed product sheet, or by the successive injection molding of a polyolefin resin and the olefinic thermoplastic elastomer.

The automobile interior parts according to the present invention are mainly used as a skin layer of door trim, instrumental panel, ceiling, steering wheel, console box, seat and the like.

The second or the third invention of the present application can provide an olefinic thermoplastic elastomer composition superior in antifogging property and, further, can afford automobile interior parts superior in antifogging property when the composition is molded.

This specification includes part or all of the contents as disclosed in the specifications of Japanese Patent Applications Nos. 2000-32184and 2000-132352, which are the bases of the priority claim of the present application.

DETAILED DESCRIPTION OF THE PREFERRED EMBODIMENTS

Hereinafter the present invention will be explained by way of Examples, which, however, should not be regarded as limiting the scope of the present invention.

The methods for measuring the properties of the mineral oil softening agent used in Examples and Comparative Examples are as follows.

(Evaporation Loss)

The oil 10 g was put in a 300 ml-volume beaker having a diameter of 60 mm, and the beaker was immersed for 1 hour in an oil bath heated to 200° C. so as for it to sink by 50 mm. The evaporation loss was determined from the change in weight of the oil before and after the immersion.

(Kinetic Viscosity and Viscosity Index)

The kinetic viscosity and viscosity index were measured according to the prescription of JIS K2283.

(Flash Point)

The flash point was measured according to the prescription of JIS K2265.

(Pour Point)

The pour point was measured according to the prescription of JIS K2269.

EXAMPLE 1

There were kneaded, with a Bumbury's mixer in nitrogen atmosphere at 180° C. for 5 minutes, 50 parts by weight of an ethylene-propylene-5-ethylidene-2-norbornene copolymer rubber (b-1) having an ethylene/propylene molar ratio of 67/33, an iodine value of 13 and a Mooney viscosity $ML_{1+4}$ (100° C.) of 74, 30 parts by weight of a polypropylene (a-1) having a MFR (ASTM D1238-65T, 230° C.) of 40 g/10 min. and a density of 0.91 g/cm³, 20 parts by weight of a polyethylene (a-2) having a MFR (ASTM D1238-65T, 230° C.) of 18 g/10 min. and a density of 0.92 g/cm³, and 20 parts by weight of a mineral oil softening agent (c-1) having a kinetic viscosity (40° C.) of 102.3 cSt, a viscosity index of 103, a flash point of 274° C., a pour point of −15° C. and a density of 0.8709 g/cm³, the evaporation loss of which at a condition of 200° C., atmospheric pressure and 1 hour had b been made 0.22% by weight by distilling a paraffinic oil (made by Idemitsu Kosan Co., trade name PW-90) (evaporation loss at 200° C., atmospheric pressure and 1 hour being 0.77% by weight) to cut low molecular weight components by 20% by weight. Then, the kneaded mass was passed through rolls to form a sheet, which was cut with a sheet cutter to produce square pellets.

The square pellets, 0.4 part by weight of 2,5-dimethyl-2, 5-(tert-butylperoxy)hexane as crosslinking agent and 0.3 part by weight of divinylbenzene as crosslinking aid were blended and stirred with a Henschel mixer.

Then, the mixture was extruded under nitrogen atmosphere at 220° C. using a twin-screw extruder having a L/D of 40 and a screw diameter of 50 mm to obtain pellets of an olefinic thermoplastic elastomer composition.

The gel content of the obtained olefinic thermoplastic elastomer composition was 88% by weight according to the previously mentioned method.

EXAMPLE 2

An olefinic thermoplastic elastomer composition was produced (molded) in the same way as Example 1, except for using a mineral oil softening agent (kinetic viscosity (40° C.) 97.25 cSt, viscosity index 103, flash point 274° C., pour point –15° C., density 0.8705 g/cm³), the evaporation loss of which at a condition of 200° C., atmospheric pressure and 1 hour had been made 0.26% by weight by distilling a paraffinic oil (made by Idemitsu Kosan Co., trade name PW-90) (evaporation loss at 200° C., atmospheric pressure and 1 hour being 0.77% by weight) to cut low molecular weight components by 10% by weight.

EXAMPLE 3

An olefinic thermoplastic elastomer composition was produced (molded) in the same way as Example 1, except for using as mineral oil softening agent a blend (c-4) of a paraffinic oil (c-3)(made by Idemitsu Kosan Co., trade name PW-90, evaporation loss at 200° C., atmospheric pressure and 1 hour being 0.77% by weight) and an oil (c-1) prepared beforehand by distilling the original oil (c-3) and cutting low molecular weight components by 20% by weight so as for the evaporation loss of the resultant to make 0.26% by weight at a condition of 200° C., atmospheric pressure and 1 hour, wherein the ratio of (c-3) to (c-1) is 20:80 by weight. The blend (c-4) had an evaporation loss of 0.35% by weight at a condition of 200° C., atmospheric pressure and 1 hour, a kinetic viscosity (40° C.) of 91.6 cSt, a viscosity index of 103, a flash point of 260° C., a pour point of –15° C. and a density 0.8705 g/cm³.

COMPARATIVE EXAMPLE 1

An olefinic thermoplastic elastomer composition was produced (molded) in the same way as Example 1, except for using as mineral oil softening agent a paraffinic oil (c-3)(i.e., original oil) (made by Idemitsu Kosan Co., trade name PW-90, evaporation loss at 200° C., atmospheric pressure and 1 hour being 0.77% by weight) which had a kinetic viscosity (40° C.) of 87.6 cSt, a viscosity index of 103, a flash point of 256° C., a pour point of –15° C. and a density of 0.8691 g/cm³.

COMPARATIVE EXAMPLE 2

An olefinic thermoplastic elastomer composition was produced(molded) in the same way as Example 1, except for using as mineral oil softening agent an oil (kinetic viscosity (40° C.) 90.5 cSt, viscosity index 103, flash point 260° C., pour point –15° C., density 0.8703 g/cm³) which was prepared by subjecting a paraffinic oil (made by Idemitsu Kosan Co., trade name PW-90, evaporation loss at a condition of 200° C., atmospheric pressure and 1 hour being 0.77% by weight) to distillation method and by cutting its low molecular weight components by 3% by weight so as for the evaporation loss to become 0.45% by weight at a condition of 200° C., atmospheric pressure and 1 hour.

EXAMPLE 4

There were kneaded, with a Bumbury's mixer in nitrogen atmosphere at 180° C. for 5 minutes, 60 parts by weight of an ethylene-propylene-5-ethylidene-2-norbornene copolymer rubber (b-1), 40 parts by weight of a polypropylene (a-1), 50 parts by weight of a mineral oil softening agent (c-1), 1 part by weight of titanium dioxide, 0.5 part by weight of zinc oxide and 2 parts by weight of a methylol phenolic curing resin (dimethylol-p-nonylphenol; compound described on Table-V in the specification of U.S. Pat. No. 4,311,628). Then, the kneaded mass was passed through rolls to form a sheet, which was cut with a sheet cutter to produce square pellets.

The square pellets and 0.3 part by weight of stannous chloride were blended and stirred with a Henschel mixer. The mixture was extruded with a twin-screw extruder in the same manner as Example 1 to obtain the pellets of an olefinic thermoplastic elastomer composition.

COMPARATIVE EXAMPLE 3

An olefinic thermoplastic elastomer composition was produced (molded) in the same way as Example 4, except for using as mineral oil softening agent the original paraffinic mineral oil (c-3) (made by Idemitsu Kosan Co., trade name PW-90) (with an evaporation loss of 0.77% by weight at 200° C., atmospheric pressure and 1 hour) having a kinetic viscosity (40° C.) of 87.6 cst, a viscosity index of 103, a flash point of 256° C., a pour point of –15° C. and a density of 0.8691 g/cm³.

Regarding the olefinic thermoplastic elastomers thus obtained, the following evaluation test was conducted, and the results are shown in Table 1.

[Antifogging Test]

Using the obtained pellets, the fogging after 100° C. and 3 hours was evaluated in terms of haze values according to the prescription of A method of DIN.

[Gloss (Visual Observation)]

The gloss was judged by visual observation.

Criterion:
  ○: glossy
  Δ: a little glossy
  ×: not glossy at all

[Tensile Properties]

The tensile properties were measured according to the prescription of JIS K6301.
  $M_{100}$: stress at 100% elongation
  $T_B$: tensile strength at break
  $E_B$ tensile elongation at break

TABLE 1

|  | Example | | | | Comparative Example | | |
| --- | --- | --- | --- | --- | --- | --- | --- |
|  | 1 | 2 | 3 | 4 | 1 | 2 | 3 |
| [Antifogging test] Haze (%) | 1.4 | 1.4 | 1.9 | 2.1 | 5.6 | 4.5 | 8.2 |
| Gloss | ◯ | ◯ | ◯ | ◯ | ◯ | ◯ | ◯ |
| [Tensile properties] | | | | | | | |
| $M_{100}$ (Kg/cm$^2$) | 4.1 | 3.6 | 4.1 | 3.3 | 3.9 | 4.1 | 3.3 |
| $T_B$ (Kg/cm$^2$) | 9.0 | 7.7 | 9.5 | 9.1 | 8.9 | 8.9 | 9.2 |
| $E_B$ (%) | 570 | 520 | 570 | 520 | 570 | 550 | 530 |

The raw materials used in the manufacture of the olefinic thermoplastic elastomer compositions of Examples and Comparative Examples described below are as follows.

(A-1) Oil-Extended ethylene-propylene-5-ethylidene-2-norbornene copolymer rubber:

Hundred parts by weight of a polymer, which has a molar ratio of ethylene/propylene (unit derived from ethylene/unit derived from propylene) of 81/19, an iodine value based on 5-ethylidene-2-norbornene of 13 and a Mooney viscosity $ML_{1+4}$ (100° C.) of 140, were oil-extended with 40 parts by weight of a paraffinic process oil (C-1, made by Idemitsu Kosan Co., trade name PW-380; kinetic viscosity at 40° C. 382 cSt.)

(A-2) Oil-Extended ethylene-propylene-dicyclopentadiene copolymer Rubber:

Hundred parts by weight of a polymer, which has a molar ratio of ethylene/propylene (unit derived from ethylene/unit derived from propylene) of 77/23, an iodine value based on dicyclopentadiene of 8 and a Mooney viscosity $ML_{1+4}$ (100° C.) of 140, were oil-extended with 40 parts by weight of a paraffinic process oil (C-1, made by Idemitsu Kosan Co., trade name PW-380; kinetic viscosity at 40° C. 382 cSt.)

(B-1) Propylene Homopolymer:

MFR (ASTM D1238-65T, 230° C., 2.16 kg load) 5 g/10 min.

(B-2) Propylene-ethylene Block Copolymer:

MFR (ASTM D1238-65T, 230° C., 2.16 kg load) 10 g/10 min., ethylene content 8 mole %

(B-3) Ethylene-4-methyl-1-pentene Random Copolymer:

MFR (190° C., 2.16 kg load) 20 g/10 min., ethylene content 97 mole %

EXAMPLE 5

There were thoroughly mixed in a Henschel mixer 75 parts by weight of pellets of an oil-extended ethylene-propylene-5-ethylidene-2-norbornene copolymer rubber (A-1) (rubbery polymer 53.6 parts by weight, paraffinic process oil 21.4 parts by weight), 25 parts by weight of pellets of a propylene homopolymer (B-1), 0.3 part by weight of an organic peroxide [2,5-dimethyl-2,5-di-(tert-butylperoxy)hexane] and 0.5 part by weight of divinylbenzene (DVB). The mixture was fed in a twin-screw extruder and subjected to dynamic heat treatment under the following conditions to obtain pellets of a thermoplastic elastomer.

Conditions of Dynamic Heat Treatment

Extruder: Werner & Pfleiderer type ZSK-53, screw diameter 53 mm

Temperature setting:

C1/C2/C3/C4/C5/D=140/160/180/220/220/200 (° C.)

Maximum shear rate: 2800 (sec$^{-1}$)

Extrusion through-put: 50 (kg/hour)

Then, 10.0 kg of the obtained pellets were put in a cage made of 100-mesh stainless wire net, and the cage and all were placed in a hot air drier to effect static heat treatment in the following conditions.

Quantity of hot air Q: 0.8 (m$^3$/(hour·kg))

Heat treatment time t: 2 (hour)

Temperature of hot air just before hitting pellets T: 115 (° C.)

Then, using 10 g of the statically heat treated pellets, the fogging test was conducted at a condition of 100° C. and 3 hours according to A method of DIN 75201, and gloss values and haze values on the tested glass plates were measured. Further, according to the following method, the diol component (2,5-dimethyl-2,5-dihydroxyhexane) remaining in the pellets was quantitatively determined. The results are shown in Table 2.

<Measuring Method for Diol Component>

The pellets 25 g were extracted with 150 ml of methyl ethyl ketone in a Soxhlet extractor for 5 hours, and the liquid was concentrated into 10 ml or less with nitrogen bubbling. The solution diluted to 25 ml with chloroform was subjected to gas chromatography to measure the concentration. For determination of the concentration a calibration curve was used which was drawn using standard samples of known concentrations.

Further, from the pellets of the obtained thermoplastic elastomer, a grain-patterned instrumental panel was molded through two-color injection molding together with a base material, propylene homopolymer. No problem arises on moldability and other and the product appearance was good.

EXAMPLE 6

The pellets of a thermoplastic elastomer were obtained in the same manner as Example 5 from 60 parts by weight of pellets of an oil-extended ethylene-propylene-dicyclopentadiene copolymer rubber (A-2) (rubbery polymer 42.9 parts by weight, paraffinic process oil 17.1 parts by weight), 25 parts by weight of pellets of a propylene-ethylene block copolymer (B-2), 15 parts by weight of pellets of an ethylene-4-methyl-1-pentene randomcopolymer (B-3), 0.2part by weight of an organic peroxide [2,5-dimethyl-2,5-di-(tert-butylperoxy)hexane] and 0.3 part by weight of divinylbenzene (DVB).

Then, 10.0 kg of the obtained pellets were put in a cage made of 100-mesh stainless wire net, and the cage and all were placed in a hot air drier to effect static heat treatment in the following conditions.

Quantity of hot air Q: 0.5 (m$^3$/(hour·kg))

Heat treatment time t: 3 (hour)

Temperature of hot air just before hitting pellets T:110 (° C.)

Then, using 10 g of the statically heat treated pellets, the fogging test was conducted in the same manner as Example 5, and the gloss values and haze values on the tested glass plates were measured. Further, the diol component (2,5-dimethyl-2,5-dihydroxyhexane) remaining in the pellets was quantitatively determined in the same manner as Example 5. The results are shown in Table 2, respectively.

Further, there were mixed with a Henschel mixer 80 parts by weight of pellets of the obtained thermoplastic elastomer, 5 parts by weight of pellets of a propylene-ethylene block copolymer (MFR 0.5 g/10 min. (ASTM D1238-65T, 230°

C., 2.16 kg), ethylene content 8 mole %) and 15 parts by weight of pellets of an ethylene-4-methyl-1-pentene random copolymer (MFR 2g/10 min. (190° C., 2.16 kg), ethylene content 97 mole %). The mixture was extruded with a T-die equipped extruder, followed by embossing with an embossing roll to produce a grain-patterned sheet having a thickness of 0.7 mm. The sheet and a polypropylene foamed product (Toray Co., PEF; PPKM15030) were subjected to heat lamination, and the composite sheet was vacuum formed at 140° C. using a male-type mold for instrumental panel and then fixed to a polypropylene-made base material to fabricate an instrumental panel. No problem arises on moldability and other and the product appearance was good.

COMPARATIVE EXAMPLE 4

The pellets 10.0 kg of a thermoplastic elastomer which had been produced from the same raw materials as Example 5 and in the same way as Example 5 were put into a cage made of 100-mesh stainless wire net, and the cage and all were placed in a hot air drier to perform static heat treatment in the following conditions.
Quantity of hot air Q: 0.05 (m$^3$/(hour·kg))
Heat treatment time t: 2 (hour)
Temperature of hot air just before hitting pellets T: 115 (° C.)
Then, using 10 g of the statically heat treated pellets, the fogging test was conducted in the same manner as Example 5, and the gloss values and haze values on the tested glass plates were measured. Further, the diol component (2,5-dimethyl-2,5-dihydroxyhexane) remaining in the pellets was quantitatively determined in the same manner as Example 5. The results are shown in Table 2, respectively.

COMPARATIVE EXAMPLE 5

The pellets 10.0 kg of a thermoplastic elastomer which had been produced from the same raw materials as Example 5 and in the same way as Example 5 were put into a cage made of 100-mesh stainless wire net, and the cage and all were placed in a hot air drier to perform static heat treatment in the following conditions.
Quantity of hot air Q: 0.8 (m$^3$/(hour·kg))
Heat treatment time t: 0.5 (hour)
Temperature of hot air just before hitting pellets T: 115 (° C.)
Then, using 10 g of the statically heat treated pellets, the fogging test was conducted in the same manner as Example 5, and the gloss values and haze values on the tested glass plates were measured. Further, the diol component (2,5-dimethyl-2,5-dihydroxyhexane) remaining in the pellets was quantitatively determined in the same manner as Example 5. The results are shown in Table 2, respectively.

COMPARATIVE EXAMPLE 6

The pellets 10.0 kg of a thermoplastic elastomer which had been produced from the same raw materials as Example 5 and in the same way as Example 5 were put into a cage made of 100-mesh stainless wire net, and the cage and all were placed in a hot air drier to perform static heat treatment in the following conditions.
Quantity of hot air Q: 0.8 (m$^3$/(hour·kg))
Heat treatment time t: 2 (hour)
Temperature of hot air just before hitting pellets T: 90 (° C.)
Then, using 10 g of the statically heat treated pellets, the fogging test was conducted in the same manner as Example 5, and the gloss values and haze values on the tested glass plates were measured. Further, the diol component (2,5-dimethyl-2,5-dihydroxyhexane) remaining in the pellets was quantitatively determined in the same manner as Example 5. The results are shown in Table 2, respectively.

COMPARATIVE EXAMPLE 7

The pellets 10.0 kg of a thermoplastic elastomer which had been produced from the same raw materials as Example 6 and in the same way as Example 5 were put into a cage made of 100-mesh stainless wire net, and the cage and all were placed in a hot air drier to perform static heat treatment in the following conditions.
Quantity of hot air Q: 0.5 (m$^3$/(hour·kg))
Heat treatment time t: 3 (hour)
Temperature of hot air just before hitting pellets T: 90 (° C.)
Then, using 10 g of the statically heat treated pellets, the fogging test was conducted in the same manner as Example 5, and the gloss values and haze values on the tested glass plates were measured. Further, the diol component (2,5-dimethyl-2,5-dihydroxyhexane) remaining in the pellets was quantitatively determined in the same manner as Example 5. The results are shown in Table 2, respectively.

TABLE 2

|  | Example | | Comparative Example | | | |
| --- | --- | --- | --- | --- | --- | --- |
|  | 5 | 6 | 4 | 5 | 6 | 7 |
| Composition |  |  |  |  |  |  |
| Oil-extended product A-1 | 75 |  | 75 | 75 | 75 |  |
| (Rubbery polymer) | (53.6) |  | (53.6) | (53.6) | (53.6) |  |
| (Process oil) | (21.4) |  | (21.4) | (21.4) | (21.4) |  |
| Oil-extended product A-2 |  | 60 |  |  |  | 60 |
| (Rubbery polymer) |  | (42.9) |  |  |  | (42.9) |
| (Process oil) |  | (17.1) |  |  |  | (17.1) |
| B-1 | 25 |  | 25 | 25 | 25 |  |
| B-2 |  | 25 |  |  |  | 25 |
| B-3 |  | 15 |  |  |  | 15 |
| Organic peroxide | 0.3 | 0.2 | 0.3 | 0.3 | 0.3 | 0.2 |
| Divinylbenzene | 0.5 | 0.3 | 0.5 | 0.5 | 0.5 | 0.3 |
| Conditions of static heat treatment |  |  |  |  |  |  |
| Quantity of hot air Q (m$^3$/hr · kg) | 0.8 | 0.5 | 0.05 | 0.8 | 0.8 | 0.5 |
| Heat treatment time t (hour) | 2 | 3 | 2 | 0.5 | 2 | 3 |
| Temperature of hot air just before hitting pellets T (° C.) | 115 | 110 | 115 | 115 | 90 | 90 |
| Residual diol component in pellets (ppm) | 10 | 15 | 35 | 35 | 40 | 50 |
| Results of fogging test |  |  |  |  |  |  |
| Gloss (%) | 92 | 90 | 35 | 42 | 26 | 21 |
| Haze (%) | 2 | 2 | 31 | 25 | 45 | 53 |

All the publications, patents and patent applications cited herein are incorporated herein by reference in their entirety.

The invention claimed is:
1. A fully or partially crosslinked olefinic thermoplastic elastomer composition comprising 10 to 90 parts by weight of a crystalline polyolefin (a), 90 to 10 parts by weight of an olefin-based copolymer rubber (b) (the total amount of the components (a) and (b) being 100 parts by weight) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt, wherein the mineral oil softening agent (c) is obtained by cutting low molecular weight components from a paraffinic oil.

2. A thermoplastic elastomer composition as defined in claim 1, wherein the mineral oil softening agent (c) has a viscosity index of 90 to 110.

3. A thermoplastic elastomer composition as defined in claim 2, wherein the mineral oil softening agent (c) has a flash point of 200 to 290° C. and a pour point of −20 to −10° C.

4. A thermoplastic elastomer composition as defined in claim 1, wherein the thermoplastic elastomer composition is cross-linked with a crosslinking agent which is an organic peroxide.

5. A thermoplastic elastomer composition as defined in claim 4, wherein the thermoplastic elastomer composition has a gel content which is 98% or less.

6. A thermoplastic elastomer composition as defined in claim 1, wherein the thermoplastic elastomer composition is cross-linked with a crosslinking agent which is a phenolic curative.

7. A thermoplastic elastomer composition as defined in claim 6, wherein the thermoplastic elastomer composition has a gel content which is 98% or less.

8. A thermoplastic elastomer composition as defined in claim 1, wherein the thermoplastic elastomer composition has a haze value determined at a condition of 100° C. and 3 hours according to the prescription of A method of DIN 75201 which is 3% or less.

9. A thermoplastic elastomer composition as defined in claim 1 which is produced by the step of static heat treatment, subsequent to dynamic heat treatment, under the following conditions:

$$Q \geq 0.1 \text{ and } t \geq 2^{-(T-110)/10}$$

wherein Q is a quantity (m$^3$/(hour·kg)) of hot air supplied upon drying per the unit weight of the substance to be treated, t is a heat treatment time (hour) and T is a temperature (° C.) of the hot air just before hitting the substance to be treated.

10. A fully or partially crosslinked olefinic thermoplastic elastomer composition comprising 10 to 90 parts by weight of a crystalline polypropylene resin (a'), 90 to 10 parts by weight of an olefin-based copolymer rubber (b) (the total amount of the components (a') and (b) being 100 parts by weight), 3 to 30 parts by weight of a polyethylene resin (d) and 3 to 100 parts by weight of a paraffinic mineral oil softening agent (c) having an evaporation loss of 0.4% by weight or less at a condition of 200° C., atmospheric pressure and 1 hour and having a kinetic viscosity (40° C.) of 50 to 250 cSt, wherein the mineral oil softening agent (c) is obtained by cutting low molecular weight components from a paraffinic oil.

11. A thermoplastic elastomer composition as defined in claim 10 which is produced by the step of static heat treatment, subsequent to dynamic heat treatment, under the following conditions:

$$Q \geq 0.1 \text{ and } t \geq 2^{-(T-110)/10}$$

wherein Q is a quantity (m$^3$/(hour·kg)) of hot air supplied upon drying per the unit weight of the substance to be treated, t is a heat treatment time (hour) and T is a temperature (° C.) of the hot air just before hitting the substance to be treated.

12. An olefinic thermoplastic elastomer composition which is produced by the step of dynamically heat treating a mixture including 40 to 85 parts by weight of an ethylene-based copolymer rubber (A), 60 to 15 parts by weight of an olefinic resin (B) and 45 parts by weight or less of a softening agent (C) (the total amount of the components (A), (B) and (C) being 100 parts by weight) in the presence of a crosslinking agent and which gives a gloss value of 80% or more and a haze value of 10% or less on glass plate when subjected to the fogging test at a condition of 100° C. and 3 hours according to the prescription of A method of DIN 75201 using 10 g of the pellets.

13. A thermoplastic elastomer composition as defined in claim 12 which is produced by the step of static heat treatment, subsequent to dynamic heat treatment, under the following conditions:

$$Q \geq 0.1 \text{ and}$$

$$t \geq 2^{-(T-110)/10}$$

wherein Q is a quantity (m$^3$/(hour·kg)) of hot air supplied upon drying per the unit weight of the substance to be treated, t is a heat treatment time (hour) and T is a temperature (° C.) of the hot air just before hitting the substance to be treated.

14. A thermoplastic elastomer composition as defined in claim 12, wherein the crosslinking agent is a bifunctional organic peroxide having two peroxide bonds in one molecule and the decomposition product thereof, diol, remains in the pellets in a concentration of 30 ppm or less.

15. A thermoplastic elastomer composition which is produced by the step of static heat treatment, subsequent to dynamic heat treatment, under the following conditions:

$$Q \geq 0.1 \text{ and}$$

$$t \geq 2^{-(T-110)/10}$$

wherein Q is a quantity (m$^3$/(hour·kg)) of hot air supplied upon drying per the unit weight of the substance to be treated, t is a heat treatment time (hour) and T is a temperature (° C.) of the hot air just before hitting the substance to be treated.

16. A thermoplastic elastomer composition as defined in claim 1, wherein the mineral oil softening agent (c) is obtained by cutting low molecular weight components from a commercially available paraffinic oil.

* * * * *